(12) United States Patent
Parkinson

(10) Patent No.: US 10,477,480 B2
(45) Date of Patent: Nov. 12, 2019

(54) PROCESSING DATA FROM A PORTABLE PROCESSING DEVICE

(71) Applicant: DRAYSON TECHNOLOGIES (EUROPE) LIMITED, Kidlington, Oxfordshire (GB)

(72) Inventor: Samuel David Parkinson, London (GB)

(73) Assignee: Drayson Technologies (Europe) Limited, Kidlington, Oxfordshire (GB)

(*) Notice: Subject to any disclaimer, the term of this patent is extended or adjusted under 35 U.S.C. 154(b) by 36 days.

(21) Appl. No.: 15/575,801

(22) PCT Filed: May 19, 2016

(86) PCT No.: PCT/EP2016/061227
§ 371 (c)(1),
(2) Date: Nov. 20, 2017

(87) PCT Pub. No.: WO2016/184951
PCT Pub. Date: Nov. 24, 2016

(65) Prior Publication Data
US 2018/0146431 A1 May 24, 2018

(30) Foreign Application Priority Data

May 21, 2015 (GB) .................................. 1508880.0
May 21, 2015 (GB) .................................. 1508881.8
(Continued)

(51) Int. Cl.
*H04W 52/02* (2009.01)
*G01C 21/10* (2006.01)
(Continued)

(52) U.S. Cl.
CPC ........ *H04W 52/0254* (2013.01); *G01C 21/10* (2013.01); *G01C 21/3423* (2013.01);
(Continued)

(58) Field of Classification Search
None
See application file for complete search history.

(56) References Cited

U.S. PATENT DOCUMENTS

2001/0018636 A1 8/2001 Mizuno
2010/0127926 A1 5/2010 Wang
(Continued)

FOREIGN PATENT DOCUMENTS

| JP | 2005236491 A | 9/2005 |
|---|---|---|
| WO | 2011038269 A1 | 3/2011 |
| WO | 2013/093785 A1 | 6/2013 |

OTHER PUBLICATIONS

Frendberg, "Determining transportation mode through cellphone sensor fusion," Massachusetts Institute of Technology, May 18, 2011, 34 pages.
International Search Report and Written Opinion dated Nov. 24, 2016, International Patent Application No. PCT/EP2016/061227, filed May 19, 2016, 25 pages.
Nham et al., "Predicting Mode of Transport from iPhone Accelerometer Data," Machine Learning Final Projects, Stanford University, Jan. 1, 2009, 5 pages.
(Continued)

*Primary Examiner* — James P Duffy
(74) *Attorney, Agent, or Firm* — Davis Wright Tremaine LLP; Philip H. Albert

(57) ABSTRACT

Data generated by a portable processing device is processed to a) control the portable processing device to switch the portable processing device from a lower-energy data generating state to a higher-energy data generating state, and from the higher-energy data generating state to the lower-energy data generating state, b) determine the mode of transport, c) determine when the portable processing device has begun a journey and ended a journey, and/or d) determine whether the portable processing device has moved more than a threshold distance.

12 Claims, 17 Drawing Sheets

(30) Foreign Application Priority Data

May 21, 2015 (GB) .................................. 1508882.6
May 21, 2015 (GB) .................................. 1508883.4

(51) Int. Cl.
  *G01C 21/34* (2006.01)
  *G06F 1/3206* (2019.01)
  *G06F 1/3287* (2019.01)

(52) U.S. Cl.
  CPC .......... *G06F 1/3206* (2013.01); *G06F 1/3287* (2013.01); *Y02D 10/171* (2018.01); *Y02D 70/00* (2018.01); *Y02D 70/142* (2018.01); *Y02D 70/164* (2018.01); *Y02D 70/26* (2018.01)

(56) References Cited

U.S. PATENT DOCUMENTS

| | | |
|---|---|---|
| 2012/0172017 A1 | 7/2012 | Ratti et al. |
| 2012/0290252 A1 | 11/2012 | Abraham |
| 2013/0073202 A1 | 3/2013 | Zheng et al. |
| 2013/0085861 A1 | 4/2013 | Dunlap |
| 2014/0159952 A1 | 6/2014 | Fitzgerald et al. |

OTHER PUBLICATIONS

Wang, "GPS/INS Integrated Urban Navigation System Based on Vehicle Motion Detection," Proceedings of 2014 IEEE Chinese Guidance, Navigation and Control Conference, IEEE, Aug. 8, 2014, pp. 667-670.

Position Change Detector

- Position Difference Calculator — 402
- Accuracy Difference Calculator — 404
- Position Difference and Accuracy Difference Comparator — 406
- Position Comparator — 408
- Speed Calculator — 410
- Speed Comparator — 412
- Acceleration Calculator — 414
- Acceleration Comparator — 416

Fig. 4    308

PROCESSING DATA FROM A PORTABLE PROCESSING DEVICE

CROSS-REFERENCE TO RELATED APPLICATIONS

This application claims priority from GB 1508880.0, GB 1508881.8, GB 1508882.6 and GB 1508883.4 all filed on 21 May 2015. The full contents of each of the priority applications is incorporated herein by cross reference.

TECHNICAL FIELD

The present disclosure relates to the technical field of processing data from a portable processing device.

BACKGROUND

Many applications ("apps") running on portable processing devices such as mobile telephones, tablet computers, laptop computers, smart watches, e-book readers, etc need to monitor the position of the portable processing device over time. However, generating position data can be a power-intensive process.

For many applications running on portable processing devices such as mobile telephones, tablet computers, laptop computers, smart watches, e-book readers, etc there is a need to identify the mode of transport of the portable processing device when it is moving (for example, walking, running, cycling, travel by car, travel by train, etc). However, reliably determining the mode of transport of a portable processing device can be difficult.

Additionally, many applications running on portable processing devices such as mobile telephones, tablet computers, laptop computers, smart watches, e-book readers, etc need to determine when the portable processing device has begun and ended a journey. However, reliably determining when a portable processing device has begun and ended a journey can be difficult, for example due to errors in the position calculated by the portable processing device.

Additionally, many applications running on portable processing devices such as mobile telephones, tablet computers, laptop computers, smart watches, e-book readers, etc need to know when the portable processing device has moved. However, reliably determining when a portable processing device has moved can be difficult, for example due to errors in the position calculated by the portable processing device.

Examples of apps running on portable processing devices that suffer from one or more of the problems above may include navigation apps, apps that provide location-specific services, environmental sensing apps, health apps, etc.

BRIEF DESCRIPTION OF THE DRAWINGS

Embodiments of the invention will now be described, by way of non-limiting example only, with reference to the accompanying drawings, in which:

FIG. 4 schematically illustrates functional processing modules of the position change detector in an embodiment.

DETAILED DESCRIPTION OF EMBODIMENTS

Although embodiments of the invention will be described below, it will be evident that various modifications may be made to these embodiments without departing from the broader spirit and scope of the invention. Accordingly, the following description and the accompanying drawings are to be regarded as illustrative rather than restrictive.

In the following description and in the accompanying drawings, numerous details are set forth in order to provide an understanding of various embodiments of the invention. However, it will be evident to those skilled in the art that embodiments may be practiced without these details.

Figure 1:
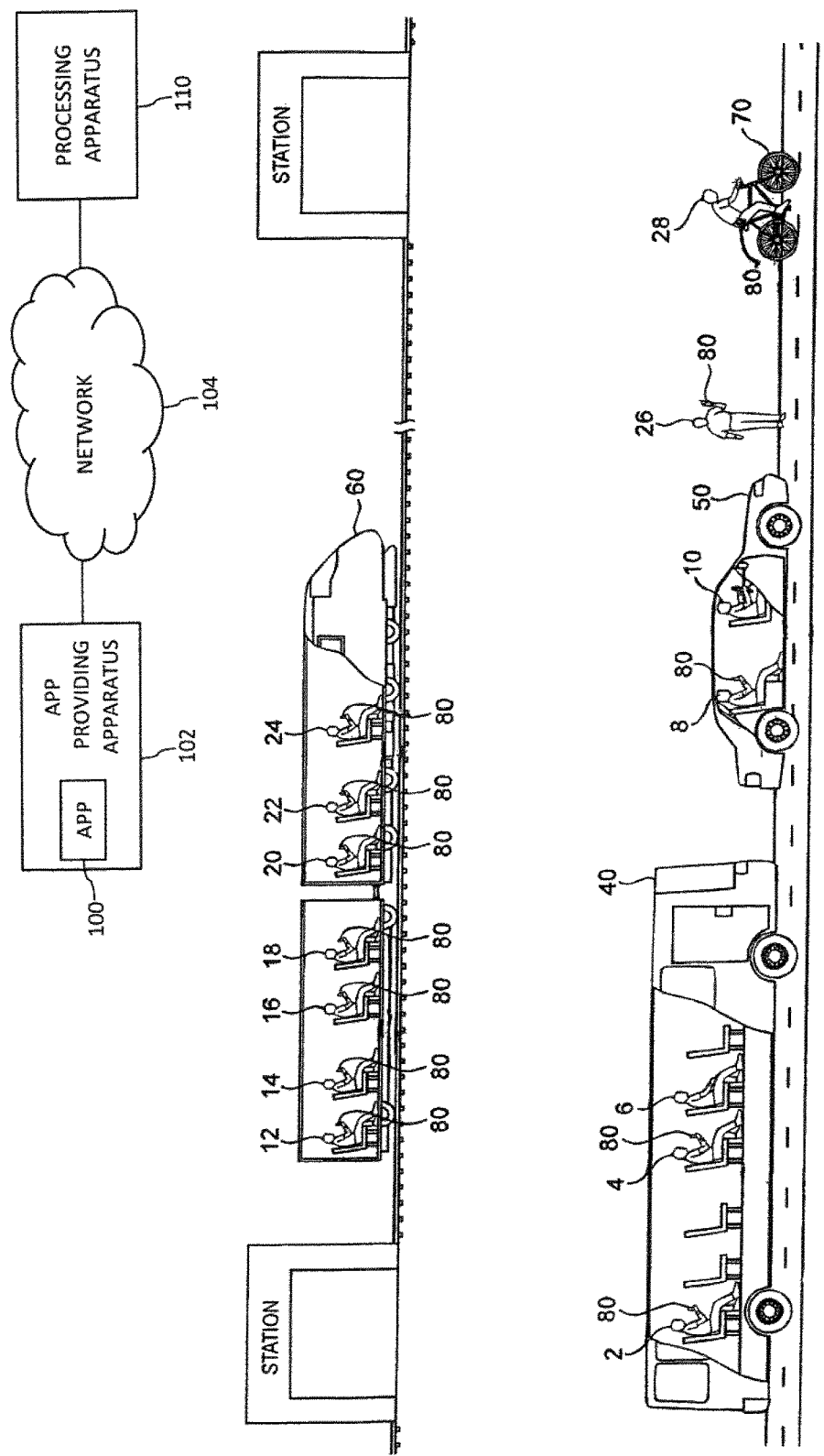
FIG. 1 schematically illustrates a plurality of people carrying portable processing devices while undertaking journeys using different modes of transport.

Referring to FIG. 1, a plurality of people 2-28 undertake journeys using different modes of transport. More particularly, in the example of FIG. 1, the people make journeys on a bus 40, in a car 50, on a train 60, on self-propelled means, such as a bicycle 70, and on foot (as represented by person 26).

Each person carries a portable processing device 80 while undertaking his or her journey (this portable processing device 80 being visible for some, but not all of the people in FIG. 1 as some of the people may carry the portable processing device in a pocket or bag such that it is obscured from view). The portable processing device 80 may comprise a mobile telephone, tablet computer, smart watch, e-book reader, laptop computer, or any other form of portable computer processing apparatus. Each portable processing device may comprise multiple separate parts configured to communicate with each other or may comprise one self-contained unit.

It will, of course, be appreciated that the people 2-28 can undertake journeys using different modes of transport than those shown FIG. 1 and embodiments of the present invention are applicable to those different modes of transport as well. For example, the people 2-28 may undertake journeys in taxis, trams, monorail trains, underground trains, motorcycles, mopeds, boats, etc. Similarly, the people may undertake journeys using other self-propelled means such as scooters, skateboards, roller-skates, rollerblades, etc.

As will be explained in more detail below, data generated by a portable processing device is processed to a) control the portable processing device to switch the portable processing device from a lower-energy data generating state to a higher-energy data generating state, and from the higher-energy data generating state to the lower-energy data generating state, b) determine the mode of transport, c) determine when the portable processing device has begun a journey and ended a journey, and/or d) determine whether the portable processing device has moved more than a threshold distance. In the present embodiment, the processing is performed on each portable processing device. More particularly, in the present embodiment, each portable processing device 80 has stored therein an app 100 downloaded from an app providing apparatus 102 via the network 104 or provided pre-installed by the manufacturer of the portable processing device. The app 100 comprises computer programming instructions which, when executed, cause the portable processing device 80 to perform processing as described below. However, in other embodiments, the processing may be performed on processing apparatus 110, to which the portable processing devices 80 transmit data via network 104. Processing apparatus 110 may comprise a single apparatus or a plurality of connected apparatus. For example, processing apparatus 110 may comprise one or more cloud servers. Network 104 may comprise one or more networks, such as the Internet, a telephone network, a cellular data network, etc. Network 104 may also comprise a virtual private network (VPN), a local area network (LAN), a wide area network (WAN), or any other form of network.

Figure 2:
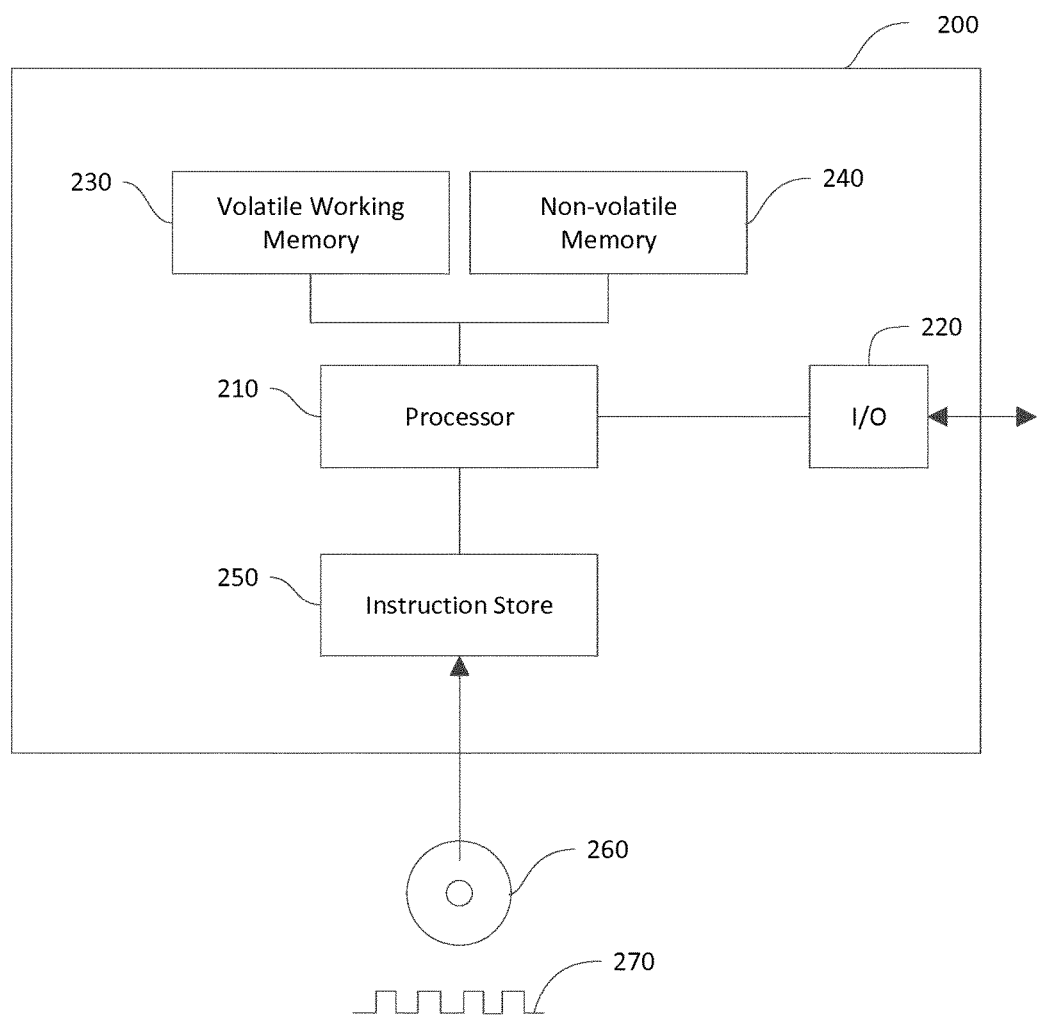
FIG. 2 schematically shows an example of a general kind of programmable processing apparatus that may be used to implement a portable processing device or a remote processing apparatus in certain embodiments of the invention.

Referring now to FIG. 2, an example of a general kind of programmable processing apparatus that may be used to implement a portable processing device 80 or processing apparatus 110 in embodiments of the present invention is shown.

The programmable processing apparatus 200 comprises one or more processors 210, one or more input/output communication modules 220, one or more volatile working memories 230, one or more non-volatile memories 240 and one or more instruction stores 250 storing computer-readable instructions which can be executed by a processor 210 to effect the functional processing modules and to perform the processing operations as described hereinafter.

At least one input/output communication module 220 comprises apparatus for communicating with network 104.

Instruction store 250 is a storage medium, which may comprise a non-volatile memory, for example in the form of a read-only memory (ROM), a magnetic computer storage device (for example a hard disk) or an optical disk, which is pre-loaded with the computer-readable instructions. Alternatively, an instruction store 240 may comprise writeable memory, such as random access memory (RAM) and the computer-readable instructions can be input thereto from a computer program product, such as a non-transitory computer-readable storage medium 260 (for example an optical disk such as a CD-ROM, DVD-ROM, etc.) or a computer-readable signal 270 carrying the computer-readable instructions.

In some embodiments, portable processing device 80 further comprises one or more sensors which may be a GPS sensor, a WiFi sensor, a gyroscope, an accelerometer, a magnetometer, etc.

Figure 3:
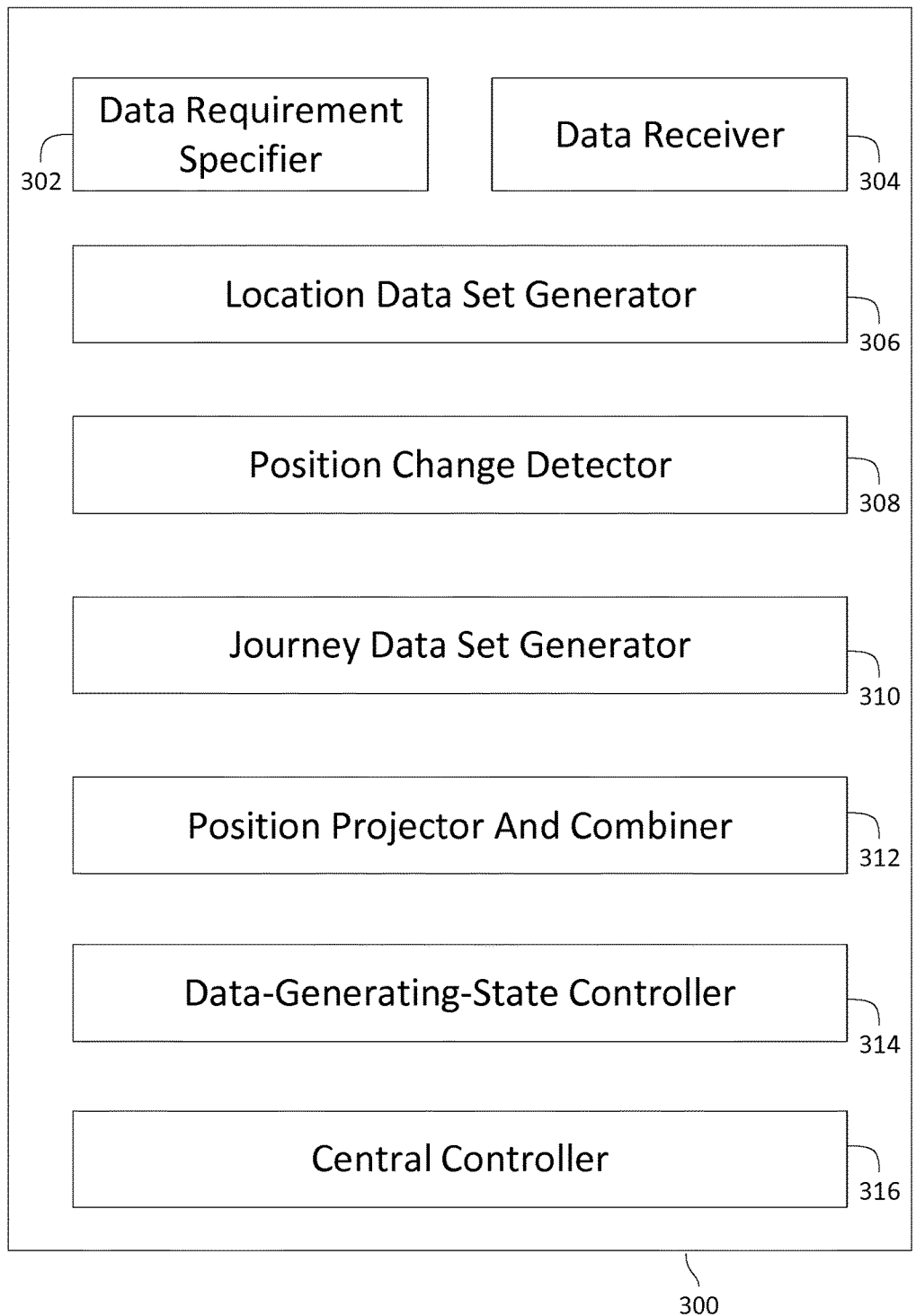
FIG. 3 schematically illustrates functional processing modules of a portable processing device or a remote processing apparatus in an embodiment.

FIG. 3 schematically illustrates some of the functional processing modules of a portable processing device 80 or processing apparatus 110 in an embodiment.

Referring to FIG. 3, a processing apparatus 300 is illustrated, which represents a portable processing device 80 and/or processing apparatus 110 (if processing is to be performed on processing apparatus 110 instead of or in addition to a portable processing device 80). When a processing apparatus 300 represents a portable processing device 80, the functional processing modules illustrated in FIG. 3 comprise modules on the portable processing device 80 that are implemented by app 100.

Processing apparatus 300 has functional modules comprising data requirement specifier 302, data receiver 304, location data set generator 306, position change detector 308, journey data set generator 310, position projector and combiner 312, data-generating-state controller 314 and central controller 316.

Data requirement specifier 302 is operable to interface with the application programming interface, API, of the portable processing device 80 to specify the requirements for data to be passed to processing apparatus 300. Such requirements comprise, by way of example, the accuracy of positions and the rate at which data is passed to processing apparatus 300.

Data receiver 304 is operable to receive data passed by the portable processing device 80.

Location data set generator 306 is operable to generate a time-ordered set of location data.

Position change detector 308 is operable to determine whether the position of the portable processing device 80 has moved more than a threshold distance.

FIG. 4 schematically illustrates the functional processing modules of position change detector 308 in this embodiment.

Referring to FIG. 4, position change detector 308 comprises position difference calculator 402, accuracy difference calculator 404, position difference and accuracy difference comparator 406, position comparator 408, speed calculator 410, speed comparator 412, acceleration calculator 414 and acceleration comparator 416.

Position difference calculator 402 is operable to calculate a position difference between a position in a sequence of positions and a preceding position in the sequence.

Accuracy difference calculator 404 is operable to calculate an accuracy difference between the accuracy of a position in a sequence and the accuracy of a preceding position in the sequence.

Position difference and accuracy difference comparator 406 is operable to compare a position difference and an accuracy difference to determine whether a position is more than a threshold distance from a preceding position.

Position comparator 408 is operable to process a time-ordered set of positions to determine whether a distance between the position at the latest time in the set and any position at an earlier time in the set is greater than a threshold distance.

Speed calculator 410 is operable to calculate a calculated speed at which the portable processing device travels.

Speed comparator 412 is operable to determine whether a calculated speed calculated by speed calculator 410 is less than a threshold speed.

Acceleration calculator 414 is operable to calculate a calculated acceleration of the portable processing device.

Acceleration comparator 416 is operable to determine whether a calculated acceleration calculated by acceleration calculator 414 is less than a threshold acceleration.

Referring again to FIG. 3, journey data set generator 310 is operable to generate a time-ordered set of journey data.

Position projector and combiner 312 is operable to calculate a projected position of the portable processing device 80 in dependence upon a preceding position and calculated combined position, by combining the projected position and a current position in dependence upon the accuracy of the preceding position and the accuracy of the current position.

Data-generating-state controller 314 is operable to switch the portable processing device 80 from a lower-energy data generating state to a higher-energy data generating state and to switch the portable processing device from a higher-energy data generating state to a lower-energy data generating state.

Central controller 316 is operable to provide central control and processing for the other functional processing modules.

Figure 5:
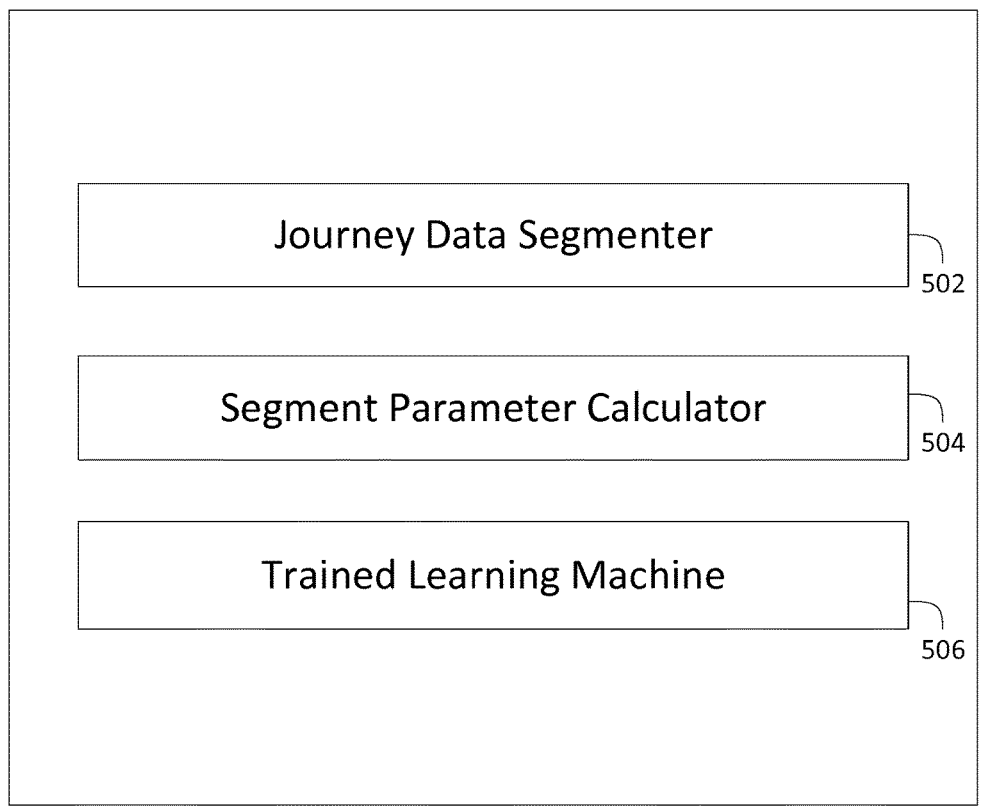
FIG. 5 schematically illustrates further functional processing modules in an embodiment.

FIG. 5 shows further functional processing modules in the present embodiment. The functional processing modules shown in FIG. 5 may be provided in the same apparatus as the functional processing modules shown in FIG. 3 or they may be provided in a separate processing apparatus. Thus, by way of example, the functional processing modules shown in FIG. 3 may be provided in a portable processing device 80, while the functional processing modules shown in FIG. 5 may be provided in processing apparatus 110.

Referring to FIG. 5, the further functional processing modules comprise journey data segmenter 502, segment parameter calculator 504 and a trained learning machine 506.

Journey data segmenter 502 is operable to process data defining a sequence of positions during a journey to divide the sequence into a series of segments.

Segment parameter calculator 504 is operable to calculate characterising parameters for each segment generated by journey data segmenter 502.

Trained learning machine 506 may comprise any form of trained learning machine, such as a support vector machine, a neural network, a relevance vector machine, a logistic regression machine, a linear regression machine, etc. Trained learning machine 506 is operable to receive the characterising parameters calculated by segment parameter calculator 504 for a segment, a preceding segment in a series and a following segment in the series as inputs, and to output a determined mode of transport for the segment.

Processing operations performed in embodiments of the invention will now be described.

Figure 6A:
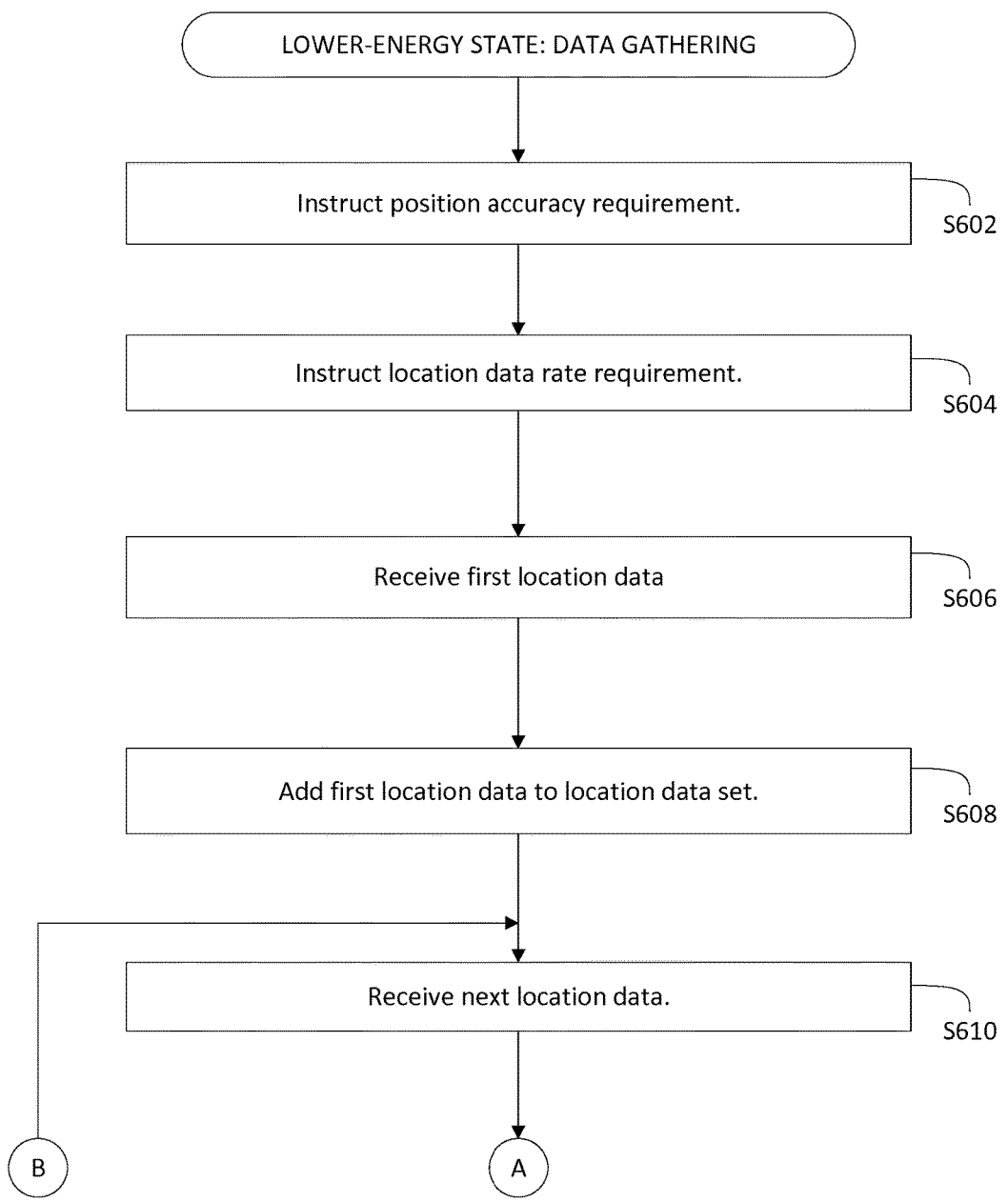
FIG. 6A and FIG. 6B show processing operations performed to gather data in a lower-energy data generating state in an embodiment.
Figure 6B:
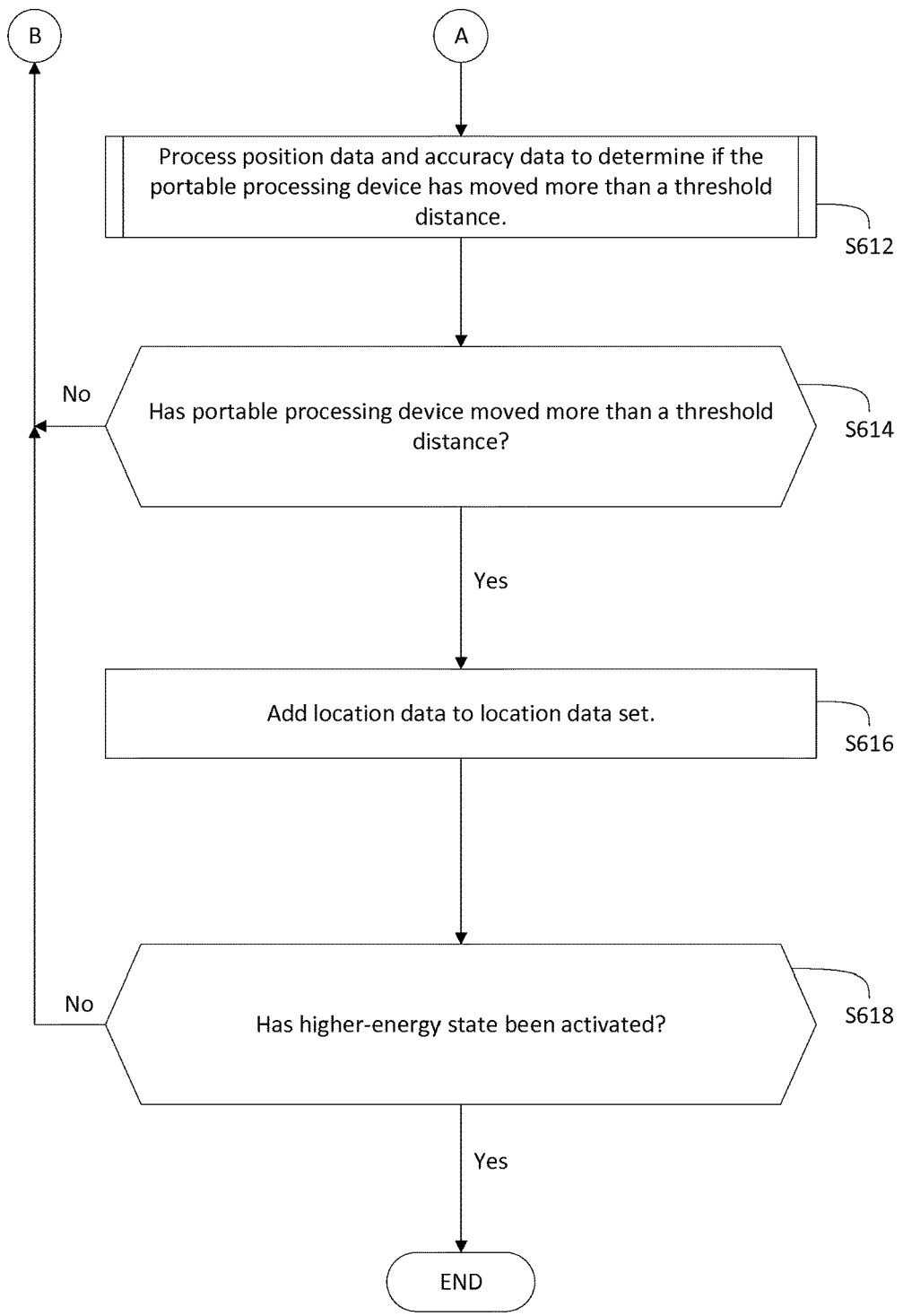

FIGS. 6A and 6B show the processing operations performed in a lower-energy state to gather data.

Referring to FIG. 6A, at step S602 and step S604, data requirement specifier 302 sends instructions to portable processing device 80 defining the accuracy of position data and the data rate required in the current operation state. As the current operation state is a lower-energy state, which is effected until it is determined that the portable processing device has started a journey in order to reduce processing and prolong the battery life of the portable processing device 80, data requirement specifier 302 instructs a relatively low position accuracy and a relatively low data rate. The position accuracy and data rate specified at steps S602 and S604 are set to values such that portable processing device 80 can use low energy sensing techniques, such as WiFi sensing. In particular, the position accuracy and data rate specified at steps S602 and S604 are set to values such that the portable processing device does not need to enable the high-energy global positioning system (GPS) sensor. By way of non-limiting example, at step S602, data requirement specifier 302 instructs a position accuracy of 100 meters or better and, at step S604, instructs a data rate of location data for one position every 5 meters (if the operating system of the portable processing device is iOS) or location data for one position every 5 seconds (if the operating system of the portable processing device is Android).

At step S606, data receiver 304 receives location data generated by portable processing device 80 for a first location. In this embodiment, the location data for a location comprises data defining a position vector (defined by a latitude and a longitude), an accuracy for the position, a speed at the position and a time-stamp.

At step S608, location data set generator 306 adds the first location data received at step S606 to a location data set. As the location data contains a time-stamp, the location data set is effectively time-ordered.

At step S610, data receiver 304 receives data generated by the portable processing device 80 for the next location.

At step S612, position change detector 308 processes the position data and the accuracy data in the received location data to determine if the portable processing device has moved more than a threshold distance.

Figure 7:
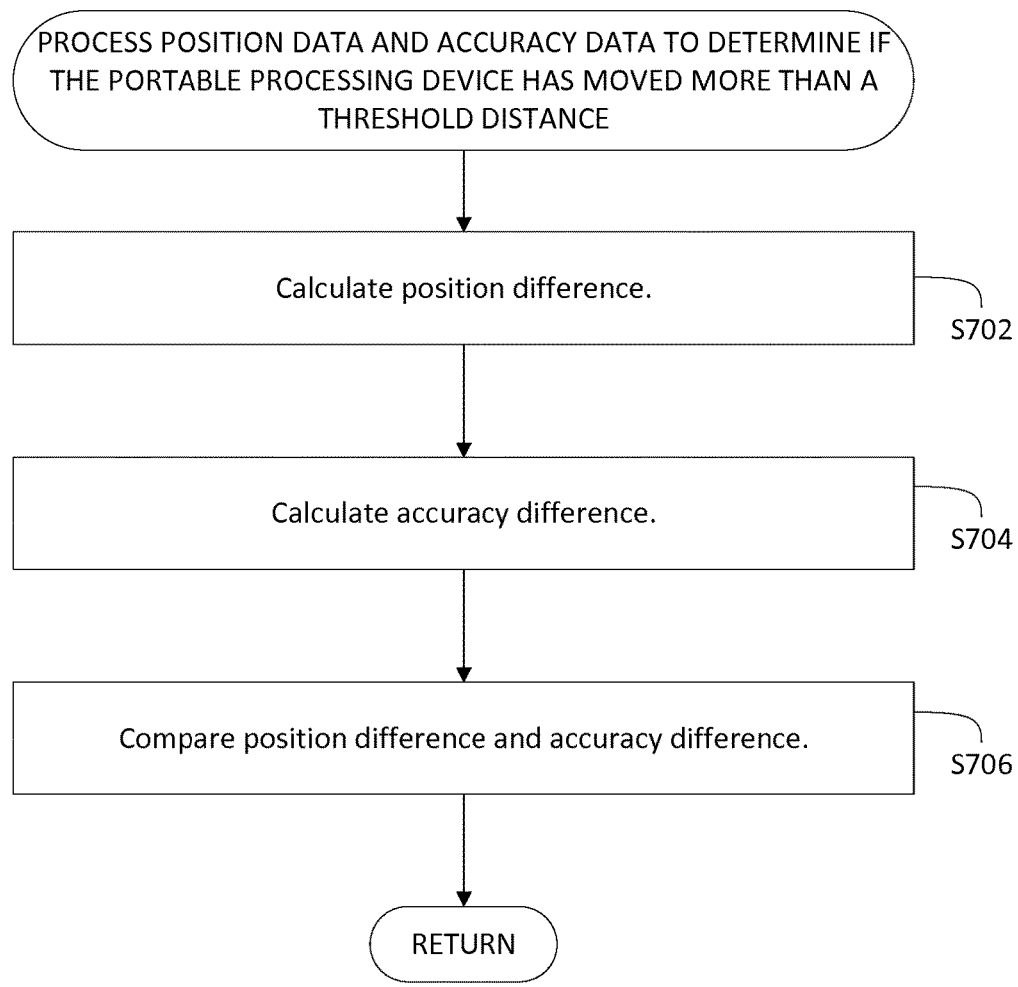
FIG. 7 shows processing operations performed at step S612 in an embodiment.

FIG. 7 shows the processing operations performed at step S612 in the present embodiment.

Referring to FIG. 7, at step S702, position difference calculator 402 calculates a position difference between the position defined in the location data received at step S610 and the position defined by the position data in the location data received for the preceding position received either at step S606 or a previous iteration of step S610.

At step S704, accuracy difference calculator 404 calculates an accuracy difference for the current position defined by the accuracy data received in the location data at step S610 and the accuracy of the preceding position defined by the accuracy data received in the location data for the preceding position.

At step S706, position difference and accuracy difference comparator 406 compares the position difference calculated at step S702 and the accuracy difference calculated at step S704 to determine whether the portable processing device 80 has moved more than a threshold distance.

More particularly, in the present embodiment, position difference and accuracy difference comparator 406 determines whether:

$$|x_{current} - x_{preceding}| < (a_{current} - a_{preceding}) \times k_1 \quad (1)$$

where $x_{current}$ is the current position (in vector form in this embodiment) defined by the position data in the location data received at the step S610, $x_{preceding}$ is the preceding position, $a_{current}$ is the accuracy of the current position defined by the accuracy data received in the location data at step S610, $a_{preceding}$ is the accuracy of the preceding position, and $k_1$ is a constant. In this embodiment, the accuracy values $a_{current}$ and $a_{preceding}$ comprise values which decrease as the accuracy increases. For example, "a" values may represent a statistical expectation of the distance between the position provided by the data and the actual position of the portable processing device. The constant $k_1$ is set to a value $0.5 \leq k_1 \leq 5$ in the present embodiment.

It will, of course, be appreciated that different techniques from that described above can be used to compare the position difference and the accuracy difference at step S706 to determine if the portable processing device has moved more than a threshold distance.

Referring again to FIG. 6B, at step S614, position difference and accuracy difference comparator 406 determines whether the portable processing device has moved more than the threshold distance. In this embodiment, position difference and accuracy difference comparator 406 determines that the portable processing device has moved more than a threshold distance if $|x_{current}-x_{preceding}|$ is not less than $(a_{current}-a_{preceding})\times k_1$.

If it is determined at step S614 that the portable processing device has not moved more than a threshold distance, then processing returns to step S610. On the other hand, if it is determined at step S614 that the portable processing device 80 has moved more than a threshold distance, then processing proceeds to step S616.

At step S616, location data set generator 306 adds the location data received at step S610 to the location data set.

At step S618, central controller 316 determines whether the higher-energy state has been activated. As will be explained below, this higher-energy state is activated when it is determined that the portable processing device has begun a journey.

If it is determined at step S618 that the higher-energy state has not been activated, then processing returns to step S610. On the other hand, if it is determined at step S618 that the higher-energy state has been activated, then processing in the current lower-energy state ends.

Figure 8:
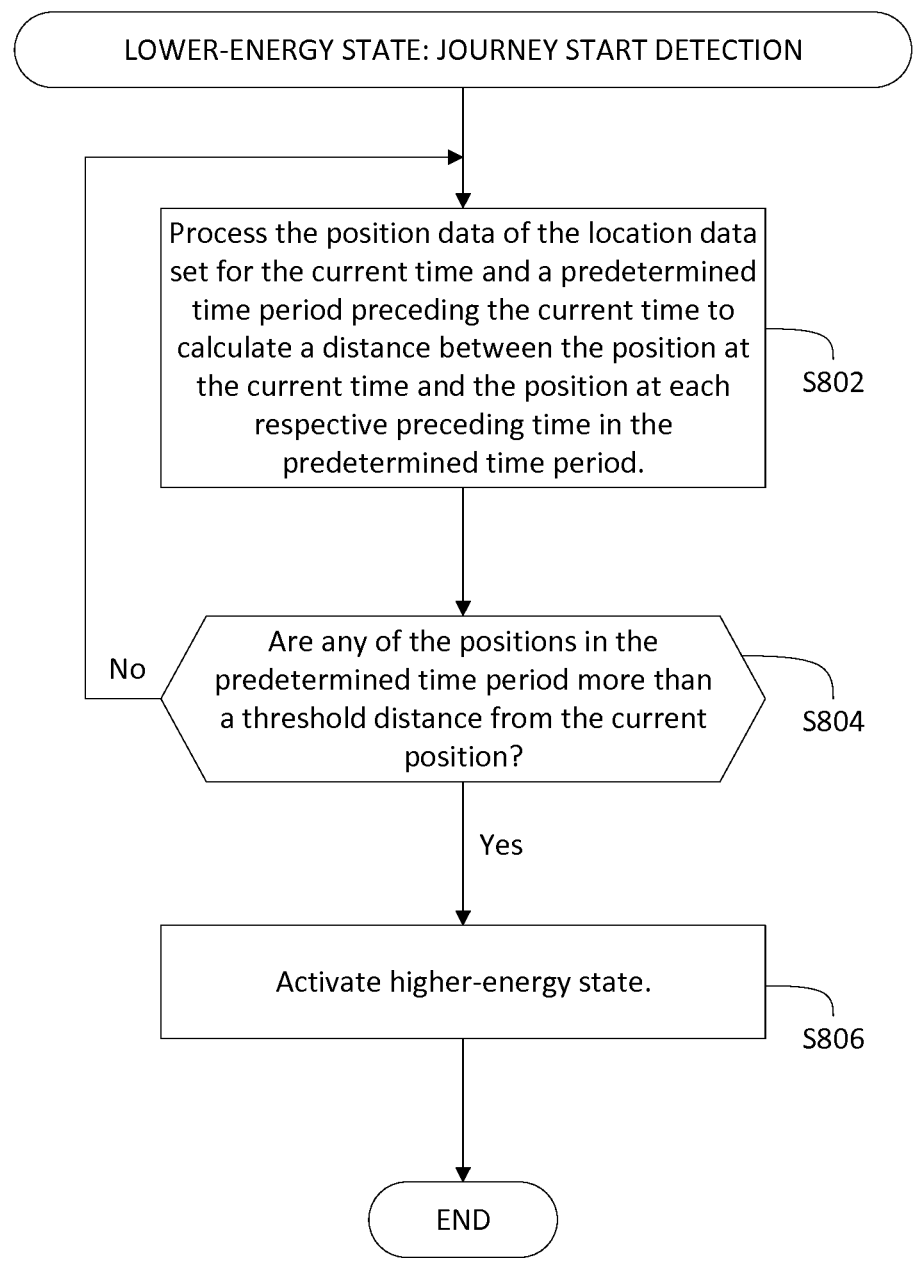
FIG. 8 shows processing operations performed to determine whether a portable processing device has begun a journey in a lower-energy data generating state in an embodiment.

FIG. 8 shows processing of operations that are performed in the lower-energy state in parallel with the processing operations shown in FIGS. 6A, 6B and 7. The processing operations shown in FIG. 8 are performed to determine whether the portable processing device 80 has begun a journey and, if it has, to activate the higher-energy state.

Referring to FIG. 8, at step S802, position comparator 408 of position change detector 308 processes the position data in the location data stored at steps S608 and S616 for the current time and a predetermined time period preceding the current time, to calculate a distance between the position at the current time and the position at each respective preceding time in the predetermined time period. More particularly, in this embodiment, position comparator 408 reads the position data stored in the location data set for a predetermined time period of "n" seconds, where $30 \leq n \leq 600$. Position comparator 408 calculates a distance between the position at the latest time in the predetermined time period and the position at each respective preceding time in the predetermined time period.

At step S804, position comparator 408 processes the distances calculated at step S802 to determine whether any of the positions in the predetermined time period are more than a threshold distance from the latest position. In this embodiment, position comparator 804 determines whether any of the distances calculated at step S802 are more than $Z_{th1}$ meters, where 5 meters$\leq Z_{th1} \leq 100$ meters.

If it is determined at step S804 that none of the positions in the predetermined time period is more than the threshold distance from the latest position, then processing returns to step S802.

On the other hand, if it is determined at step S804 that one or more of the positions in the predetermined time period is more than the threshold distance from the current position, then it is determined that the portable processing device 80 has started a journey and processing proceeds to step S806, at which data-generating-state controller 314 activates the higher-energy state.

Processing of operations performed in the higher-energy state will now be described.

Figure 9A:
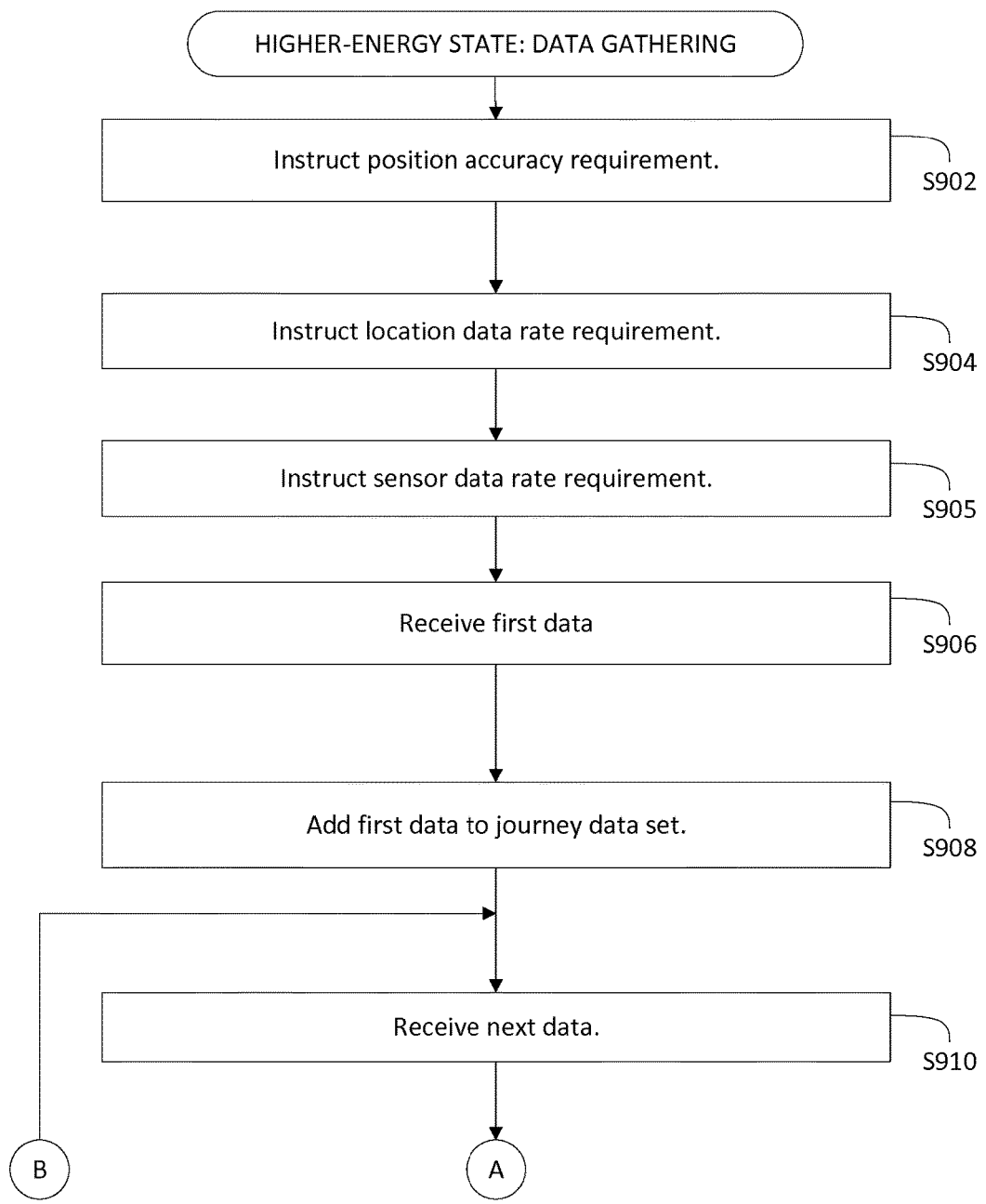
FIG. 9A and FIG. 9B show processing operations to gather data in a higher-energy data generating state in an embodiment.
Figure 9B:
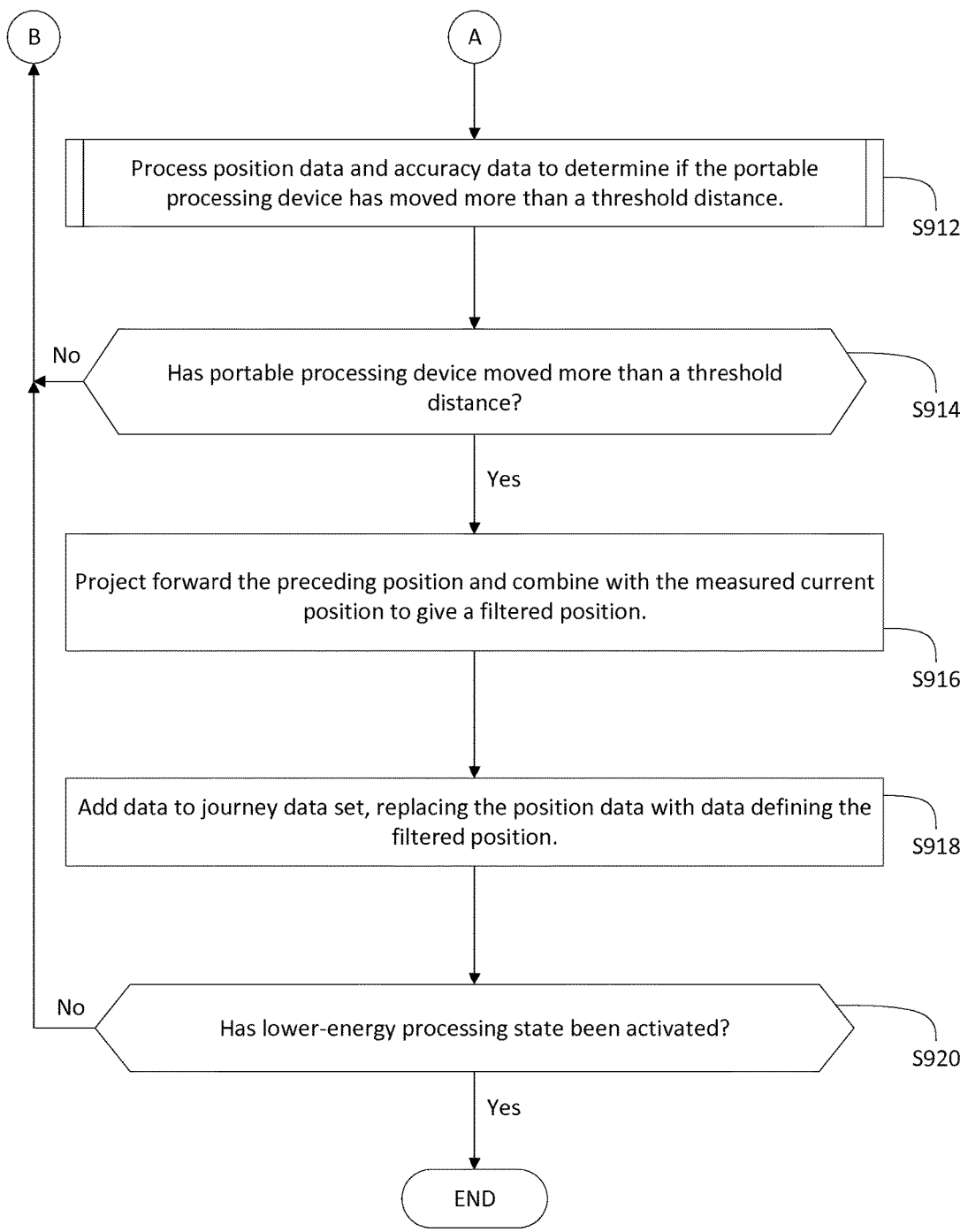

FIGS. 9A and 9B show the processing operations performed in the higher-energy state to gather data.

Referring to FIG. 9A, at steps S902 and S904, data requirement specifier 302 sends instructions to the portable processing device 80 defining the position accuracy and the location data rate required in the higher-energy state. As described above, the higher-energy state is effected when it is determined that the portable processing device 80 has moved more than a threshold distance within a predetermined time period and has therefore begun a journey. Accordingly, a higher position accuracy and a higher data rate is required in this state than in the lower-energy state described above. This higher position accuracy and higher location data rate may require the portable processing device 80 to use sensors such as a GPS sensor, an accelerometer, a gyroscope and/or a magnetometer. More particularly, by way of non-limiting example, at step S902, data requirement specifier 302 may instruct a position accuracy of 10 meters or better and, at step S904, may instruct an unlimited data rate such that portable processing device 80 passes location data as and when it is generated.

At step S905, data requirement specifier 302 sends instructions to the portable processing device 80 defining the sensor data rate required in the higher-energy state. This is specified separately from the location data rate at step S904 in this embodiment because some portable processing devices may provide location data and sensor data separately. In this embodiment, data requirement specifier 302 sends instructions to the portable processing device 80 to supply sensor data at a rate equal to the location data.

At step S906, data receiver 304 receives data for the first location from the portable processing device 80. In this embodiment, the data comprises location data and sensor data. The data comprises data defining a position (specified by a latitude and a longitude), an accuracy for the position, a speed at the position, acceleration at the position, and a time-stamp.

At step S908, journey data set generator 310 adds the data received at step S906 to a journey data set.

At step S910, data receiver 304 receives data for the next position.

At step S912, position change detector 308 processes the position data and accuracy data in the data received at step S910 to determine if the portable processing device 80 has moved more than a threshold distance.

Figure 10:
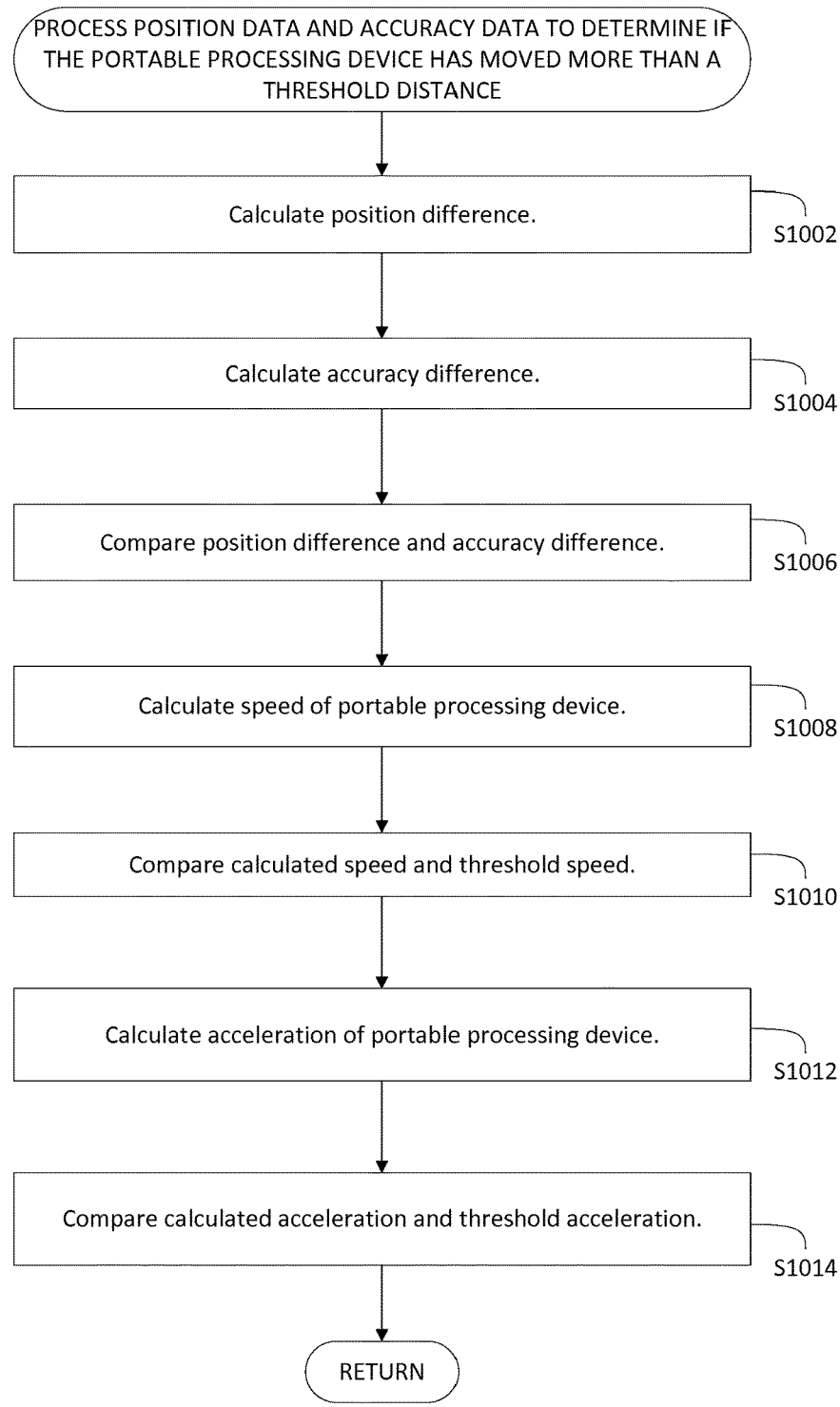
FIG. 10 shows processing operations performed at step S912 in an embodiment.

FIG. 10 shows the processing operations performed by position change detector 308 at step S912.

Referring to FIG. 10, at step S1002, position difference calculator 402 calculates a position difference between the position defined by the data received at step S910 and the preceding position in the journey data received either at step S906 or a previous iteration of step S910.

At step S1004, accuracy difference calculator 404 calculates an accuracy difference between the accuracy of the position defined by the data received at step S910 and the accuracy of the preceding position in the journey data set.

At step S1006, position difference and accuracy difference comparator 406 compares the position difference calculated at step S1002 and the accuracy difference calculated at step S1004 to determine if the portable processing device has moved more than a threshold distance. In particular, in this embodiment, position difference and accuracy difference comparator 406 determines whether:

$$|x_{current}-x_{preceding}|<(a_{current}-a_{preceding})\times k_2 \qquad (2)$$

where $x_{current}$ is the current position defined by the position data in the location data received at the step S910, $x_{preceding}$ is the preceding position, $a_{current}$ is the accuracy of the current position defined by the accuracy data received in the location data at step S910, $a_{preceding}$ is the accuracy of the preceding position, and $k_2$ is a constant. In this embodiment, the accuracy values $a_{current}$ and $a_{preceding}$ comprise values which decrease as the accuracy increases. The constant $k_2$ is set to a value $0.5 \le k_2 \le 5$ in the present embodiment. In this embodiment, the value of $k_2$ is set to a value lower than the value of $k_1$ employed in the lower-energy state at step S706.

Position difference and accuracy difference comparator 406 determines that the portable processing device has moved more than a threshold difference if $|x_{current} - x_{preceding}|$ is not less than $(a_{current} - a_{preceding}) \times k_2$.

At step S1008, speed calculator 410 calculates a calculated speed of the portable processing device when travelling from the preceding position to the current position. More particularly, speed calculator 410 calculates the calculated speed in accordance with the following equation:

$$v_{calculated, current} = \frac{|x_{current} - x_{preceding}|}{t_{current} - t_{preceding}} \quad (3)$$

where the $x_{calculated, current}$ is the calculated speed for the current position, $x_{current}$ is the current position, $x_{preceding}$ is the preceding position, $t_{current}$ is the time for the current position and $t_{preceding}$ is the time for the preceding position.

That is, speed calculator 410 calculates the speed by dividing the position difference calculated at step S1002 by the difference in the time-stamps of the current position and the preceding position. As this calculated speed is calculated based upon the position data (rather than the speed data received from the portable processing device at step S906 and S910), the calculated speed is indicative of the accuracy of the position.

At step S1010, speed comparator 412 compares the calculated speed calculated at step S1008 with a threshold speed. The threshold speed may be set at a value indicative of the maximum speed expected of a transport on which the portable processing device may be carried. In the example illustrated in FIG. 1, train 60 is likely to travel at the fastest speed and therefore in this embodiment, a threshold speed based on the fastest speed of train is set. Accordingly, by way of non-limiting example, a threshold speed is set of 60 meters per second.

If it is determined that the calculated speed is greater than the threshold speed, then it is determined that the position data is inaccurate and that the portable processing device has not moved more than a threshold distance.

At step S1012, acceleration calculator 414 calculates a calculated acceleration of the portable processing device when travelling from the preceding position to the latest position. In this embodiment, acceleration calculator 414 calculates the calculated acceleration in accordance with the following equation:

$$w_{calculated, current} = \frac{|v_{calculated, current} - v_{calculated, preceding}|}{t_{current} - t_{preceding}} \quad (4)$$

where $w_{calculated, current}$ is the calculated acceleration for the current position, $v_{calculated, current}$ is the calculated speed for the current position, $v_{calculated, preceding}$ is the calculated speed for the preceding position, $t_{current}$ is the time for the current position and $t_{preceding}$ is the time for the preceding position.

That is, acceleration calculator 414 calculates the calculated acceleration by calculating the difference between the calculated speed calculated at step S1008 for the current position and the calculated speed calculated on a previous iteration at step S1008 for the preceding position and dividing the calculated difference in the calculated speeds by the time given by the difference in the time-stamp for the current position and the time-stamp for the preceding position. In this way, the calculated acceleration is calculated in dependence upon the current position and the preceding position, and is therefore indicative of the accuracy of those positions.

At step S1014, acceleration comparator 416 compares the calculated acceleration calculated at step S1012 with a threshold acceleration. The threshold acceleration is set in dependence upon the maximum acceleration likely to be experienced by the portable processing device 80 when undergoing a journey. In the example of FIG. 1, the train 60 is likely to have the fastest acceleration and therefore, in this embodiment, the threshold acceleration is set in dependence upon the maximum likely acceleration of train 60. By way of non-limiting example, in this embodiment, a threshold acceleration is set of 20 ms$^{-2}$.

If it is determined at step S1014 that the calculated acceleration is greater than the threshold acceleration, then it is determined that the position data is likely to be inaccurate and therefore it is determined that the portable processing device has not moved more than the threshold distance.

Referring again to FIG. 9B, at step S914, it is determined whether the portable processing device 80 has moved more than a threshold distance. More particularly, in this embodiment, if it is determined at any of steps S1006, S1010 or S1014 that the portable processing device has not moved more than the threshold distance, then processing returns to step S910. On the other hand, if it is determined in all of the comparisons of step S1006, S1010 and S1014 that the portable processing device has moved more than the threshold distance, then processing proceeds to step S916.

At step S916, processing is performed to further improve the statistical accuracy of the position data. This processing is optional and may be omitted.

At step S916, position projector and combiner 312 projects forward to preceding position to give a projected position, and combines that projected position with the current position to give a filtered position. More particularly, in this embodiment, position projector and combiner 312 calculates a projected position $x_{projected}$ and an accuracy for the projected position $a_{projected}$ in accordance with the following equations:

$$x_{projected} = x_{preceding} + v_{preceding} \times (t_{current} - t_{preceding}) + \tfrac{1}{2} w_{preceding} \times (t_{current} - t_{preceding})^2 \quad (5)$$

$$a_{projected} = \sqrt{(a_{preceding})^2 + \sigma^2 (t_{current} - t_{preceding})^2} \quad (6)$$

In equation (5) above, $v_{preceding}$ is the speed at the preceding position as defined in the data received from the portable processing device, and $w_{preceding}$ is an acceleration at the preceding position calculated as the ratio of the difference between the speed at the preceding position and the speed at a second preceding position, and the difference between the respective times of the preceding position and the second preceding position.

In equation (6) above, $\sigma$ is a constant having a value $0.5\ \text{ms}^{-1} \le \sigma \le 10\ \text{ms}^{-1}$.

Position projector and combiner 312 then combines the projected position $x_{projected}$ with the current position $x_{current}$ to give a filtered position $x_{filtered}$ as follows:

$$x_{filtered} = \frac{(a_{projected})^2 \times x_{current} + (a_{current})^2 \times x_{projected}}{(a_{projected})^2 + (a_{current})^2} \quad (7)$$

In this way, the projected position and the current position are combined in dependence upon the accuracy of the preceding position (which was used in equation (6) to calculate the accuracy of the projected position) and the accuracy of the current position.

A Kalman filter could be employed in the processing step S916.

Referring again to FIG. 9B, at step S918, journey data set generator 310 adds the data received at step S910 to the journey data set, but replacing the position data in the received data with data defining the filtered position calculated at step S916, if this filtering was performed.

At step S920, a central controller 316 determines whether the lower-energy state has been activated.

If it is determined at step S920 that the lower-energy state has not been activated, then processing returns to step S910. On the other hand, if it is determined at step S920 that the lower-energy state has been activated then processing in the higher-energy state ends and the processing in the lower-energy state described above with reference to FIGS. 6A, 6B, 7 and 8 starts again.

Figure 11:
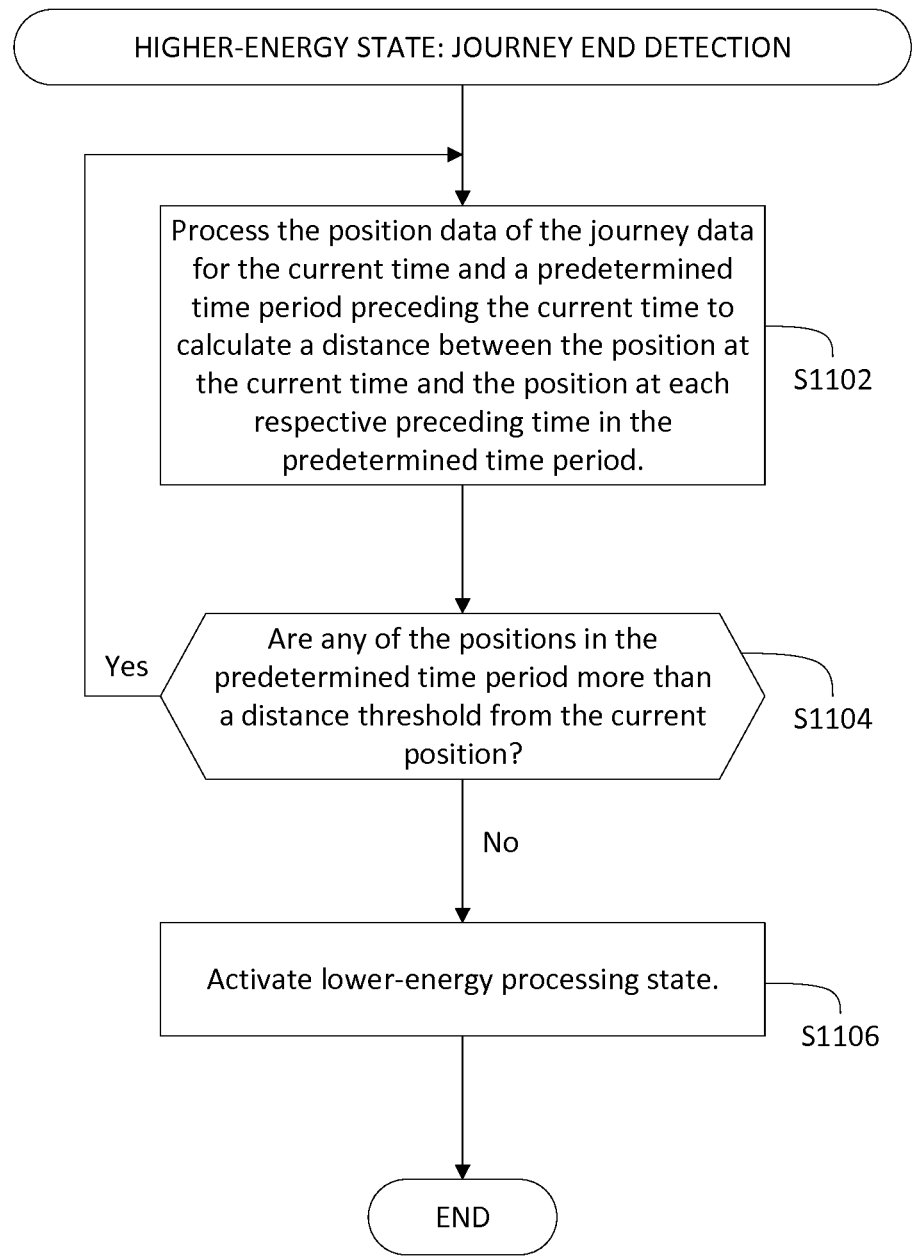
FIG. 11 shows processing operations performed in a higher-energy data generating state to detect the end of a journey by the portable processing device in an embodiment.

FIG. 11 shows the processing operations performed in the higher-energy state to determine whether the portable processing device 80 has moved more than a threshold distance, and to switch the portable processing device from the higher-energy state to the lower-energy state. The processing operations shown in FIG. 11 are performed in parallel with the processing operations shown in FIGS. 9A, 9B and 10.

Referring to FIG. 11, at step S1102, position comparator 408 of position change detector 308 processes the position data in the journey data at the current time and the position data in the journey data for a predetermined time period preceding the current time to calculate a distance between the position at the current time and a position at each respective preceding time in the predetermined time period. In this embodiment, position comparator 408 performs the calculations for a time period of "m" seconds where $30 \leq m \leq 600$. The value of "m" need not be the same as the value of "n" used in the processing at step S802.

At step S1104, position comparator 408 determines whether any of the distances calculated at steps S1102 are greater than a threshold distance, that is, whether any of the positions in the predetermined time period are more than a threshold distance from the current position. More particularly, in this embodiment, position comparator 408 determines at step S1104 whether any of the distances calculated at step S1102 are greater than a threshold distance $Z_{th2}$ where $Z_{th2}$ has a value 5 meters $\leq Z_{th2} \leq 100$ meters. $Z_{th2}$ need not have the same value as $Z_{th1}$ employed at the processing in step S804.

If it is determined at step S1104 that at least one of the positions in the predetermined time period is more than a threshold distance from the current position, then it is determined that the portable processing device has moved more than a threshold distance and is still undergoing a journey, such that processing in the higher-energy state should continue. Accordingly, processing returns to step S1102.

On the other hand, if it is determined in step S1104 that none of the positions in the predetermined time period are more than the threshold distance from the current position, then it is determined that the mobile processing device has not moved more than the threshold distance and has ended its journey. Accordingly, processing proceeds to step S1106, at which data-generating-state controller 314 activates the lower-energy state.

The processing operations that are performed to determine the mode(s) of transport for a portable processing device on a journey will now be described with reference to FIGS. 12A, 12B, 13 and 14. These processing operations can be performed whilst the processing operations in the lower-energy state or the higher-energy state are being performed, or they may be performed when the portable processing device 80 is in neither state. As noted above, the processing operations to determine the mode(s) of transport may be performed on the processing device 80 or in processing apparatus 110.

Figure 12A:
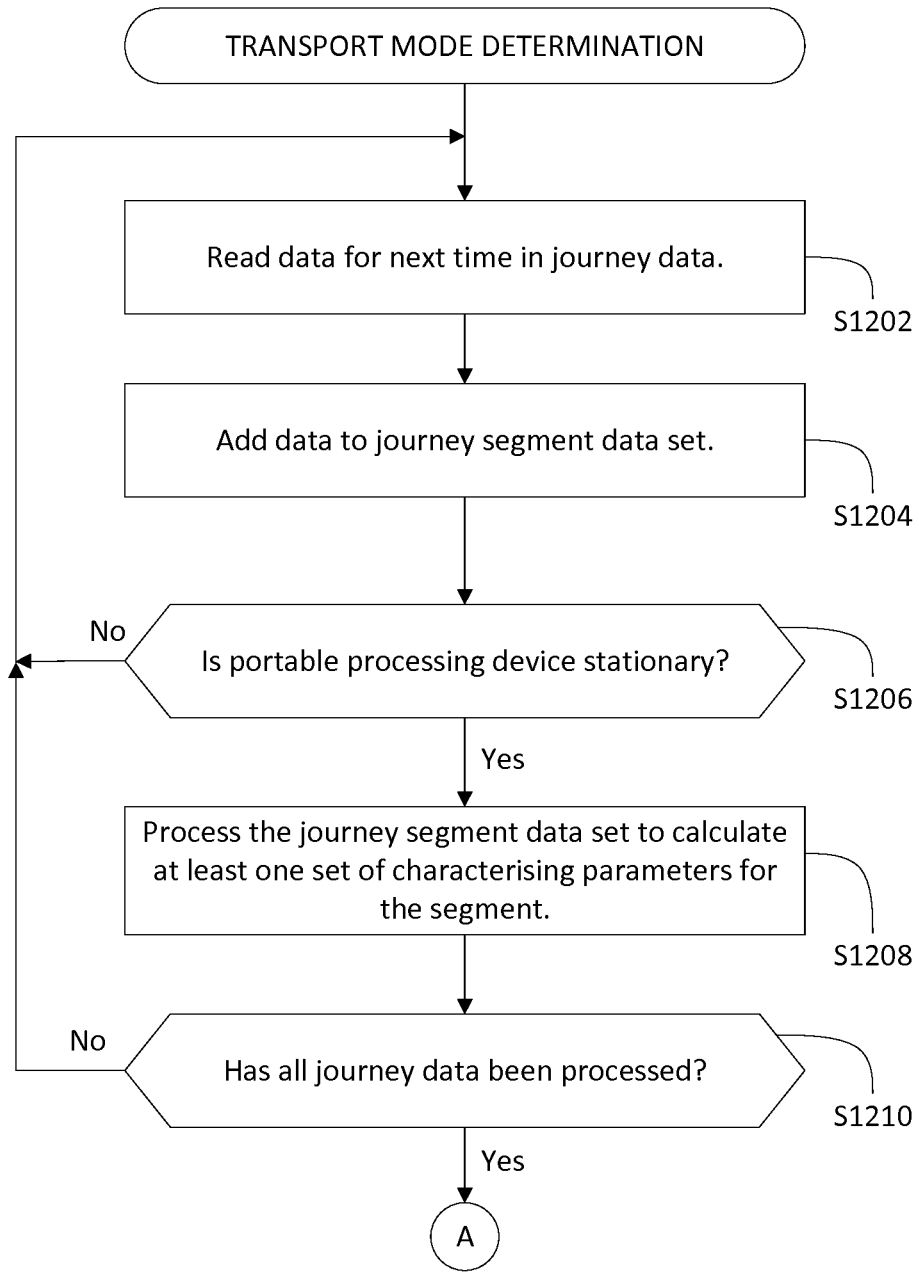
FIG. 12A and FIG. 12B show processing operations performed in an embodiment to determine a mode of transportation for a journey by a portable processing device.
Figure 12B:
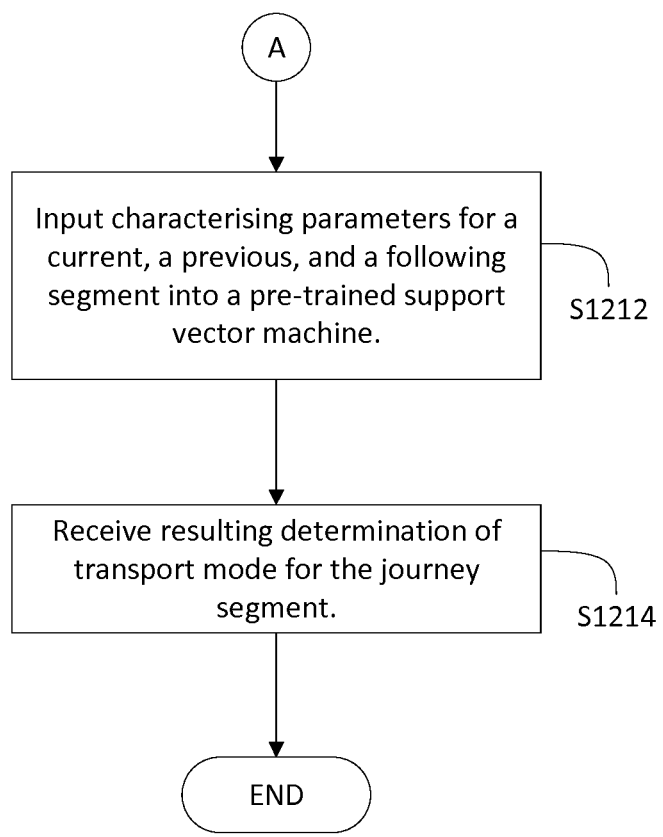

Referring to FIG. 12A at step S1202, journey data segmenter 502 reads the data for the next time in the journey data previously stored at steps S908 and S918 (this being the data for the first time in the journey data the first time step S1202 is performed).

At step S1204, journey data segmenter data 502 adds the data read at step S1202 to a current segment data set.

At step S1206, journey data segmenter 502 processes the data read at step S1202 to determine if the portable processing device is stationary. More particularly, journey data segmenter 502 reads the speed data from the data and determines that the portable processing device is stationary if the speed data is zero or within a threshold speed of zero, such as less than 0.2 meters per second.

If it is determined at step S1206 that the portable processing device is not stationary, then processing returns to step S1202 to add further data to the current segment data set.

On the other hand, if it is determined at step S1206 that the portable processing device is stationary, then the segment data set is closed and processing proceeds to step S1208, at which segment parameter calculator 504 processes the segment data set to calculate at least one set of characterising parameters for the segment.

In this embodiment, segment parameter calculator 504 calculates a set of time-based characterising parameters and a set of frequency-based characterising parameters.

The time-based characterising parameters calculated by segment parameter calculator 504 comprise at least one of speed characterising parameters, acceleration characterising parameters and angular velocity characterising parameters.

The speed characterising parameters comprise:
the time span of the segment;
the mean speed in the segment;
the standard deviation of the speed in the segment;
the maximum speed in the segment;
a plurality of $L^P$-norms of the speed in the segment.

The acceleration characterising parameters comprise:
the mean absolute acceleration in the segment;
the standard deviation of the absolute acceleration in the segment;
the maximum absolute acceleration in the segment;
a plurality of $L^P$-norms of the absolute acceleration in the segment.

The angular velocity characterising parameters comprise:
the mean absolute angular velocity in the segment;
the standard deviation of the absolute angular velocity in the segment;
the maximum absolute angular velocity in the segment; and
a plurality of $L^P$-norms of the absolute angular velocity in the segment.

The mean speed during the journey segment may be calculated by integrating the speed supplied by GPS and dividing by the time span of the segment.

With regard to the plurality of $L^P$-norms of the speed in the segment, segment parameter calculated 504 may calculate the $L^{10}$ norm of the speed, the $L^{20}$ norm of the speed, the $L^{30}$ norm of the speed, the $L^{40}$ norm of the speed and the $L^{50}$ norm of the speed.

Each $L^P$-norm may be normalised by the length of the segment.

Each $L^P$-norm of the speed may be calculated using the following equation:

$$L^p = \|v\|_p = 1/2 \left( \frac{\sum_{i=2}^{n} |v_i|^p (t_i - t_{i-1})}{t_n - t_1} \right)^{1/p} \quad (8)$$

where v is the speed, t is the time, n is the number of speeds in the segment, and subscripts are indices for each speed and respective time in the segment.

With regard to the $L^P$-norms of the absolute acceleration, segment parameter calculator 504 may calculate the $L^{10}$ norm of the absolute acceleration, the $L^{20}$ norm of the absolute acceleration, the $L^{30}$ norm of the absolute acceleration, the $L^{40}$ norm of the absolute acceleration and the $L^{50}$ norm of the absolute acceleration.

Each $L^P$-norm may be normalised by the length of the segment.

Segment parameter calculator 504 may calculate each $L^P$-norm of the absolute acceleration using the following equation:

$$L^p = \|w\|_p = 1/2 \left( \frac{\sum_{i=2}^{n} |w_i|^p (t_i - t_{i-1})}{t_n - t_1} \right)^{1/p} \quad (9)$$

where w is the acceleration, t is the time and n is the number of accelerations in the segment, and subscripts are indices for each acceleration and respective time in the segment.

With regard to the $L^P$-norms of the angular velocity, segment parameter calculator 504 may calculate the $L^{10}$ norm of the angular velocity, the $L^{20}$ norm of the angular velocity, the $L^{30}$ norm of the angular velocity, the $L^{40}$ norm of the angular velocity and the $L^{50}$ norm of the angular velocity.

Each $L^P$-norm may be normalised by the length of the segment.

Segment parameter calculator 504 may calculate each $L^P$-norm of the angular velocity using the following equation:

$$L^p = \|s\|_p = 1/2 \left( \frac{\sum_{i=2}^{n} |s_i|^p (t_i - t_{i-1})}{t_n - t_1} \right)^{1/p} \quad (10)$$

where s is the angular velocity, t is the time, n is the number of angular velocity in the segment, and subscripts are indices for each angular velocity and respective time in the segment.

In addition to the time-based parameters described above, segment parameter calculator 504 may calculate further time-based characterising parameters comprising at least one of:

- a probability of the mean speed in the segment being cycling;
- a probability of the mean speed in the segment being running;
- a probability of the mean speed in the segment being walking;
- a probability of the mean speed in the segment being travelling by car;
- a probability of the mean speed in the segment being travelling by bus; and
- a probability of the mean speed in the segment being travelling by train.

By way of example, the probability of the mean speed being cycling and probability of the mean speed being running may be based on mean speeds of cyclists and mean speeds of runners obtained from suitable apps, such as the Strava app.

Segment parameter calculator 504 generates the frequency-based characterising parameters by performing fast Fourier transforms (FFTs) on the data. By way of example, the FFTs may be performed on data with periods of ten seconds at one second intervals. The data may be interpolated to generate 256 regularly spaced samples over a ten second period and then fast Fourier transformed.

The frequency-based characterising parameters calculated by segment parameter calculator 504 comprise:

- the total energy in the frequency spectrum averaged over all FFTs in the segment;
- the energy in the frequency spectrum averaged over all FFTs in the segment in a first frequency range;
- the energy in the frequency spectrum averaged over all FFTs in the segment in at least one further frequency range, different from the first frequency range; and
- the entropy of the frequency spectrum averaged over all FFTs in the segment.

By way of non-limiting example, segment parameter calculator 504 may calculate the energy in the frequency spectrum averaged over all FFTs in a segment between 0-1 Hz, the energy in the frequency spectrum averaged over all FFTs in a segment between 1-2 Hz, the energy in the frequency spectrum averaged over all FFTs in the segment between 2-3 Hz, the energy in the frequency spectrum averaged over all FFTs in the segment between 3-4 Hz and the energy in the frequency spectrum averaged over all FFTs in the segment between 4-5 Hz.

In addition to the frequency-based characterising parameters described above, segment parameter calculator 504 may calculate further frequency-based characterising parameters comprising:

- the mean signal-to-noise ratio (SNR) within the frequency range 0.5 Hz to 2 Hz (this frequency range corresponding to the human motion frequency range); and
- the maximum SNR within the frequency range 0.5 Hz to 2 Hz (this frequency range corresponding to the human motion frequency range).

The SNR may be calculated within every FFT. The strongest signal within the range 0.5 Hz to 2 Hz may be identified. The noise floor may be approximated by taking a trimmed average of the rest of the spectrum. The trimmed average excludes the four largest and four smallest values from the spectrum.

Segment parameter calculator 504 may calculate further frequency-based characterising parameters comprising calculating a plurality of $L^p$-norms of the signal-to-noise ratio, such as the $L^5$ norm, the $L^{10}$ norm, the $L^{15}$ nor, the $L^{20}$ norm and the $L^{25}$ norm.

A step S1210, journey data segmenter 502 determines whether all of the stored journey data has been processed.

If it is determined at step S1210 that not all of the journey data has been processed, then processing returns to step S1202 to form a new segment data set. On the other hand, if it is determined at step S1210 that all of the journey data has been processed, then processing proceeds to step S1212.

At step S1212, the characterising parameters calculated at step S1208 for a current segment, a previous segment in the journey and a following segment in the journey are input into a pre-trained learning machine.

Figure 13:
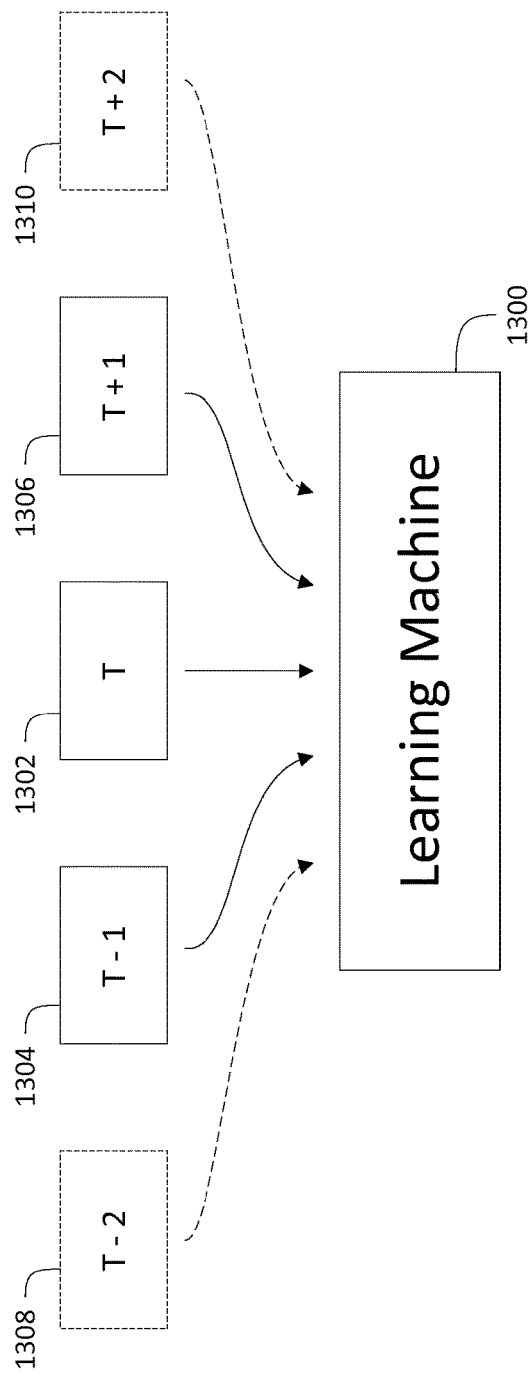
FIG. 13 schematically illustrates the training of a learning machine in an embodiment.

More particularly, referring to FIG. 13, a learning machine 1300 has previously been trained using multiple sets of training data. Each set of training data comprises characterising parameters for at least 3 segments, namely a current segment 1302, a previous segment in the journey 1304 and a following segment in the journey 1306. Optionally, characterising parameters for at least one further previous segment 1308 and at least one further following segment 1310 may be included in each training set.

Figure 14:
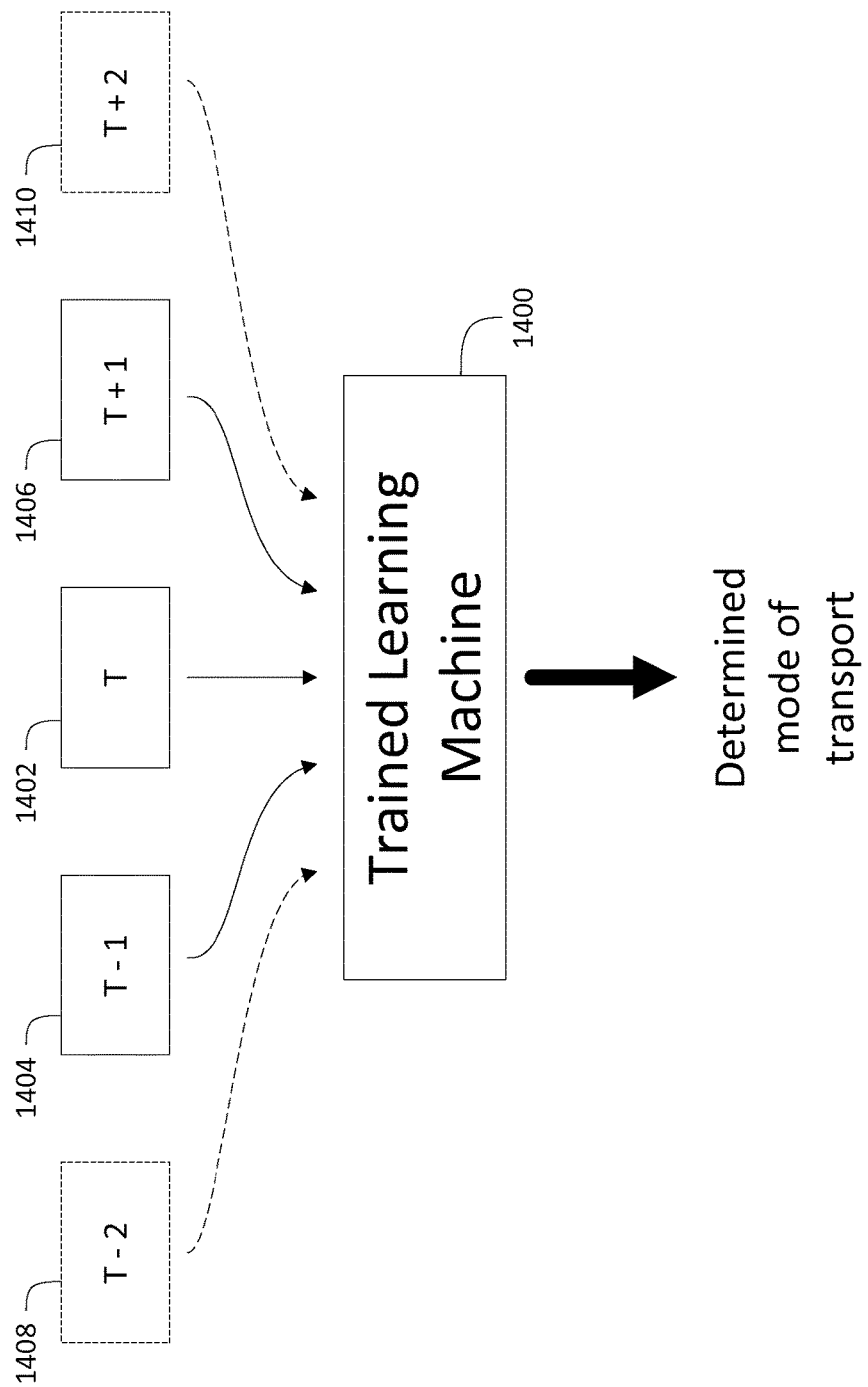
FIG. 14 schematically illustrates the use of a trained learning machine in an embodiment to determine a mode of transport of a portable processing device.

Training the learning machine in this way generates a trained learning machine 1400 as schematically illustrated in FIG. 14.

At step S1212, the characterising parameters calculated for current segment 1402, a previous segment 1404 in the journey and a following segment 1406 in the journey are input into the trained learning machine 1400. Optionally, characterising parameters for at least one further previous segment 1408 and at least one further following segment 1410 may be input into the trained learning machine 1400.

Referring again to FIG. 14B, step S1214, the resulting determination of the transport mode for the current journey segment 1402 is received as an output from the trained learning machine 1400.

Modifications

Many modifications can be made to the embodiment described above within the scope of the accompanying claims.

For example, in the embodiment described above the processing at steps S802 and S804, as well the processing at steps S1102 and S1104, calculates the distance between a current position and each respective preceding position in a predetermined time period to determine any of the positions in the predetermined time period is more than a threshold distance from the current position. However, instead, the processing at steps S802 and S804 and/or the processing at steps S1102 and S1104 could be performed by calculating a distance between the current position and a single statistical position, which is calculated based on each preceding position in the predetermined time period, so as to give a single distance which is then compared against a distance threshold.

In the embodiment described above, the processing performed at steps S916 and S918 in the higher-energy mode cold also be performed in the lower energy mode in place of the processing at step S616.

In this embodiment, data requirement specifier 302 sends instructions to the portable processing device 80 at step S905 to instruct the portable processing device to supply sensor data at a rate equal to the location data. However, data requirement specifier 302 may specify a sensor data rate that is different form the location data rate and may store the sensor data and the location data in different sets (it being possible to determine the data for any give position/time that requires processing by means of the time stamps on the data).

In the embodiment described above, when the data is received in the higher-energy state in steps S906 and S910, a timer may be set to count down from a time out value (such as, by way of non-limiting example, 3 minutes) and, if the timer reaches zero before new data is received on the next iteration of step S910, the data-generating-state controller 314 activates the lower-energy state if this has not already been activated in the meantime.

In the embodiment described above, each portable processing device 80 is carried by a person. However, instead a portable processing device 80 could be a portable processing device carried on an item such as a package, parcel, container, etc that undergoes a journey.

The skilled person will, of course, understand that many further modifications and variations can be made.

The invention claimed is:

1. A computer-implemented method of controlling a portable processing device to switch the portable processing device from a lower-energy data generating state to a higher-energy data generating state, the method comprising:
   processing data generated by the portable processing device in the lower-energy data generating state to determine whether the portable processing device has moved more than a threshold distance in a predetermined time; and
   when it is determined that the portable processing device has moved more than the threshold distance in the predetermined time, switching the portable processing device to the higher-energy data generating state;
   wherein processing data generated by the portable processing device in the lower-energy data generating state to determine whether the portable processing device has moved more than the threshold distance comprises:
   (a) receiving data generated by the portable processing device defining a sequence of positions and, for each respective position, an accuracy of the position;
   (b) for each of a plurality of positions in the sequence, processing the data defining the position and the accuracy of the position as well as the data defining a preceding position in the sequence and the accuracy of the preceding position, to determine whether the position is more than a first threshold distance from the preceding position; and
   (c) processing data defining a time-ordered set of the positions for which it was determined that the position is more than the first threshold distance from the preceding position, to determine whether a distance between the position at the latest time in the time-ordered set and any position at an earlier time in the time-ordered set is greater than a second threshold distance;
   wherein, when it is determined that the distance between the position at the latest time in the time-ordered set and any position at the earlier time in the time-ordered set is greater than the second threshold distance, the portable processing device is switched from the lower-energy data generating state to the higher-energy data generating state; and
   wherein the processing to determine whether the position is more than the first threshold distance from the preceding position comprises:
   (a) calculating a position difference between the position and the preceding position;

(b) calculating an accuracy difference between the accuracy of the position and the accuracy of the preceding position; and (c) comparing the position difference and the accuracy difference to determine whether the position is more than the first threshold distance from the preceding position, wherein the processing to determine whether the position is more than the first threshold distance from the preceding position comprises determining whether:

$$|x_2-x_1|>(a_2-a_1)k$$

where $x_2$ is the position, $x_1$ is the preceding position, $a_2$ is the accuracy of the position, $a_1$ is the accuracy of the preceding position, and k is a constant, and $a_2$ and $a_1$ comprising values that decrease as the accuracy increases.

2. A non-transitory computer readable medium comprising computer program instructions configured to program a processor to perform the method of claim 1.

3. A method according to claim 1, wherein the first threshold distance is a function of the accuracy of the position and the accuracy of the preceding position.

4. A computer-implemented method of processing data from a portable processing device to determine when the portable processing device has begun a journey, the method comprising:

receiving data generated by the portable processing device defining a sequence of positions and, for each respective position, an accuracy of the position;

for each of a plurality of positions in the sequence, processing the data defining the position and the accuracy of the position as well as the data defining a preceding position in the sequence and the accuracy of the preceding position, to determine whether the position is more than a first threshold distance from the preceding position;

processing data defining a time-ordered set of the positions for which it was determined that the position is more than the first threshold distance from the preceding position, to determine whether a distance between the position at the latest time in the time-ordered set and any position at an earlier time in the time-ordered set is greater than a second threshold distance; and when it is determined that the distance between the position at the latest time in the time-ordered set and any position at the earlier time in the time-ordered set is greater than the second threshold distance, it is determined that the portable processing device has begun a journey;

wherein the processing to determine whether the position is more than the first threshold distance from the preceding position comprises:
(a) calculating a position difference between the position and the preceding position;
(b) calculating an accuracy difference between the accuracy of the position and the accuracy of the preceding position; and
(c) comparing the position difference and the accuracy difference to determine whether the position is more than the first threshold distance from the preceding position, wherein the processing to determine whether the position is more than the first threshold distance from the preceding position comprises determining whether:

$$|x_2-x_1|>(a_2-a_1)k$$

where $x_2$ is the position, $x_1$ is the preceding position, $a_2$ is the accuracy of the position, $a_1$ is the accuracy of the preceding position, and k is a constant, and $a_2$ and $a_1$ comprising values that decrease as the accuracy increases.

5. A non-transitory computer readable medium comprising computer program instructions configured to program a processor to perform the method of claim 4.

6. A method according to claim 4, wherein the first threshold distance is a function of the accuracy of the position and the accuracy of the preceding position.

7. A computer-implemented method of processing data from a portable processing device to determine when the portable processing device has ended a journey, the method comprising:

receiving data generated by the portable processing device defining a sequence of positions and, for each respective position, an accuracy of the position;

for each of a plurality of positions in the sequence, processing the data defining the position and the accuracy of the position as well as the data defining a preceding position in the sequence and the accuracy of the preceding position, to determine whether the position is more than a first threshold distance from the preceding position;

for the positions for which it is determined that the position is more than the first threshold distance from the preceding position in the sequence, generating a time-ordered set of positions;

processing data defining the time-ordered set of positions to determine whether a distance between the position at the latest time in the time-ordered set and any position at an earlier time in the time-ordered set is greater than a second threshold distance; and when it is determined that the distance between the position at the latest time in the time-ordered set and each position at the earlier time in the time-ordered set is not greater than the second threshold distance, it is determined that the portable processing device has ended a journey;

wherein the processing to determine whether the position is more than the first threshold distance from the preceding position comprises:
(a) calculating a position difference between the position and the preceding position;
(b) calculating an accuracy difference between the accuracy of the position and the accuracy of the preceding position; and
(c) comparing the position difference and the accuracy difference to determine whether the position is more than the first threshold distance from the preceding position, wherein the processing to determine whether the position is more than first threshold distance from the preceding position comprises determining whether:

$$|x_2-x_1|>(a_2-a_1)k$$

where $x_2$ is the position, $x_1$ is the preceding position, $a_2$ is the accuracy of the position, $a_1$ is the accuracy of the preceding position, and k is a constant, and $a_2$ and $a_1$ comprising values that decrease as the accuracy increases.

8. A method according to claim 7, wherein the processing to determine whether the position is more than the first threshold distance from the preceding position further comprises:

calculating a calculated speed of the portable processing device travelling from the preceding position to the position; and determining whether the calculated speed is less than a threshold speed.

9. A method according to claim 7, wherein the processing to determine whether the position is more than the first threshold distance from the preceding position further comprises:
calculating a calculated acceleration of the portable processing device travelling from the preceding position to the position; and
determining whether the calculated acceleration is less than a threshold acceleration.

10. A method according to claim 7, wherein the time-ordered set of positions is generated by:
processing each position for which it is determined that the position is more than the first threshold distance from the preceding position in the sequence, to:
(a) calculate a projected position in dependence upon the preceding position and a speed at the preceding position defined by data generated by the portable processing device; and
(b) calculate a filtered position by combining the projected position and the position in dependence upon the accuracy of the preceding position and the accuracy of the position; and
generating a time-ordered set of the filtered positions.

11. A non-transitory computer readable medium comprising computer program instructions configured to program a processor to perform the method of claim 7.

12. A method according to claim 7, wherein the first threshold distance is a function of the accuracy of the position and the accuracy of the preceding position.

* * * * *